3,230,130
PROCESS FOR LAMINATING REGENERATED CELLULOSE FILMS
Clifton Paul Wilcox, Madison, Tenn., assignor to E. I. du Pont de Nemours and Company, Wilmington, Del., a corporation of Delaware
No Drawing. Filed Aug. 22, 1961, Ser. No. 133,067
11 Claims. (Cl. 156—314)

This invention relates to the preparation of a laminate composed of a plurality of regenerated cellulose films and has as its object the preparation of a relatively pliable laminate that resists delamination upon exposure to moisture. Other objects will appear hereinafter.

The objects are accomplished by applying a solution of an organic acid having an ionization constant of $10^{-2}$ to $10^{-6}$, preferably 0.1–1% (based on the weight of the dried laminate), uniformly on at least one of the pair of opposing surfaces of anchorage resin-impregnated regenerated cellulose gel films followed by pressing the pair of opposing surfaces into intimate contact prior to heating in order to dry the laminated films.

In the process of laminating regenerated cellulose films, two sheets of the gel regenerated cellulose film are first formed by the conventional viscose process, preferably but not necessarily by extruding the two films simultaneously through a pair of elongated orifices into the conventional acid-sulfate bath. Upon emergence from the bath, the newly formed films are brought together in face-to-face relation and, in this relation, are drawn through a series of treating baths to complete regeneration and to desulfur and otherwise purify the films. The films are separated briefly from time to time during their passage through the baths in order to treat both sides of each film. Immediately prior to drying the films, they are usually passed separately but simultaneously through a bath containing a softening agent. The concentration of softening agent in this bath is such that after excess liquid has been removed from the surface of the films and the films are subsequently dried, each film will contain 8–25% of the softening agent.

To secure adhesion between the films and to promote adhesion of any coatings that may be applied to the outer surface of the laminate, the films are impregnated or coated with a partially polymerized anchorage resin. The anchorage resin may be applied in a separate bath but is usually applied along with the softener in the softening bath. The resin content of the softener bath or of the aqueous solution applied to the film may be between 0.1 and 10%. The pH of the softener bath is preferably about 7. Excellent adhesion is obtained when the resin concentration in the ultimate laminate is between 0.15 and 2%, preferably 0.40–0.75%, solids based on the dry weight of the laminate. After being impregnated with softener and resin, the films are brought together, pressed into intimate contact and dried while in such contact over steam heated dryer rolls.

To secure the advantages of the present invention, the films, prior to laminating and drying, are given an application of a solution of the water-soluble organic acid having an ionization constant of $10^{-2}$–$10^{-6}$. For effective results, the amount of acid used should provide 0.1–1% of the acid, based on the weight of the dried laminate, or, perhaps more realistically, an amount of acid that is at least 0.1%, based on the weight of the dried laminate, but also 5–200%, based on the weight of the resin in the dried laminate. The films are then laminated by passage through the nip of press rolls or the like. Thereafter, the films while being maintained in intimate contact are dried to a moisture content of 4–10% by passage over a series of steam-heated rolls. Exposure to the steam-heated rolls at a temperature of about 100° C. serves not only to dry the laminate but also to cure the anchorage resin, i.e. to provide a high degree of condensation in the resin with an accompanying strongly bonded laminate. Exposure of the laminate thus formed to moisture or to an aqueous dispersion of a coating composition produces no substantial effect on the strength of the bond. This is shown by the superior heat-seal strength at high humidity. In fact, the present process serves as an important contribution in the coating of laminates with aqueous dispersions, particularly with aqueous dispersions of vinylidene chloride polymers of the type disclosed in U.S. Patent 2,570,478 to Pitzl, U.S. Patent 2,462,185 to Hauser and U.S. Patent 2,711,996 to Hofrichter.

Furthermore, with respect to the application of aqueous dispersions to the laminate, it has been found that when at least 0.4% of the resin has been used, i.e. 0.4–1.0%, and the water-soluble organic acid is applied in accordance with the process of the present invention, the resin between the films being laminated is cured sufficiently during the normal drying process to yield a strongly bonded laminate yet the resin on the outer surface is not overcured. The outer surface can then be coated with a vinylidene chloride copolymer in an aqueous dispersion, e.g. vinylidene chloride, methyl acrylate and itaconic acid in a weight ratio of 94/6/1 prepared as described in U.S. Patent 2,570,478. The itaconic acid in this aqueous coating composition is sufficient to catalyze the curing of the anchorage resin on the outer surface of the laminate during the drying of the coating. Hence, the product obtained is a coated laminate having superior bond strength within the laminate as well as outstanding anchorage for the coating.

While the invention is discussed primarily with regard to regenerated cellulose films prepared by the viscose process, the invention is applicable to cellulose films made by the cuprammonium process, the denitration of nitrocellulose or from solutions of cellulose in organic or inorganic solvents. The invention is also applicable to hydrophilic pellicular materials in general. These include films of cellulose ethers, especially the alkali soluble but water insoluble cellulose ethers formed by reacting cellulose with ethylene oxide, methyl chloride or ethyl chloride.

The softening agent used in the process is not critical. Thus, the common polyhydric alcohols and polyethers may be used. The most important are glycerol, ethylene glycol, propylene glycol and hexylene glycol.

Although the preferred anchorage resin is a guanidine-urea-formaldehyde resin, any of the guanidine-carbamide-aldehyde resins disclosed in U.S. Patent 2,533,557 to Chapman would be satisfactory. Other resins which could be used in carrying out the process of the present invention are: the urea-aldehyde disclosed in U.S. Patent 2,159,007 to Charch et al.; the melamine-formaldehyde resin precondensates of U.S. Patent 2,345,543 to Wohnsiedler et al.; the urea-formaldehyde and melamine-urea-formaldehyde precondensates of U.S. Patent 2,564,925 to Pollard; the melamine-formaldehyde-polyalkylene-polyamine resin disclosed in U.S. Patent 2,796,362 to Wooding; or various mixtures of the foregoing resins. In general, any water-soluble or water-dispersible thermosetting resin may be used in carrying out the process of this invention, providing the resin can be further polymerized to an insoluble form in the presence of the acid catalyst.

The preferred group of acids for use in the invention are citric, maleic, itaconic, lactic, gluconic and tartaric acids. For many reasons, citric acid is the acid most preferred for use in this invention. However, any water-soluble organic acid having an ionization constant of $10^{-2}$ to $10^{-6}$ may be used. Hence, any acid from the following list may be used in the invented process to obtain an improvement: acetic, acrylic, adipic, allylacetic, β-allylpropionic, barbituric, benzoic, bromoacetic, o, m and p-bromobenzoic, o, m and p-bromophenylacetic, α and β-bromopropionic, β-(iso-butenyl)-propionic, p-tert.-butylbenzoic, p-tert.-butyl-phenylacetic, n-butyric, iso-butyric, camphoric, n-caproic, n-capyrylic, chloroacetic, o, m and p-chlorobenzoic, o, m and p-chlorocinnamic, o, m and p-chlorophenylacetic, o, m and p-chloro-p-phenylpropionic, α and β-chloropropionic, cis and trans-cinnamic, cinnamylideneacetic, citronoic, crotonic, cuminic, cyclobutane-1,1-dicarboxylic, cyclohexane-1,1-dicarboxylic, cyclopentane-1,1 - dicarboxylic, cyclopropane - 1,1 - dicarboxylic, diethylacetic, diethylmalonic, 3,4-dimethoxyphenylacetic, β-β-dimethylacrylic, dimethylmalonic, dinitro-o-cresol, 2,4 - dinitrophenylacetic, diphenylacetic, di-n-propylmalonic, ethylacrylic, p-ethylbenzoic, ethylmalonic, p-ethylphenylacetic, ethyl-n-propylmalonic, o, m and p-fluorobenzoic, p-fluorophenylacetic, formic, fumaric, gallic, glutaric, glycolic, n-heptoic, hexahydrobenzoic, hippuric, hydrazoic, o, m and p-hydroxybenzoic, o and m-hydroxycinnamic, o and m-iodobenzoic, o, m and p-iodophenylacetic, malic, malonic, mandelic, mesaconic, o, m and p-methoxybenzoic, o, m and p-methoxycinnamic, p-methoxyphenylacetic, o, m and p-methoxy-β-phenylpropionic, o, m and p-methylcinnamic, cis and transmethylethylacrylic, methylethylmalonic, methylmalonic, p-methyl-phenylacetic, o, m and p-methyl-β-phenylpropionic, music, α and β-naphthoic, o, m and p-nitrobenzoic, o, m and p-nitrocinnamic, o and p-nitrophenylacetic, o and p-nitro-β-phenylpropionic, n-pelargonic, o, m and p-phenoxybenzoic, phenylacetic, o-phenylbenzoic, α-phenylbutyric, phenylmalonic, β-phenylpropionic, o-phthalic, pimelic, propenylacetic, β-propenylpropionic, propionic, n and isopropylacrylic, β-propylidenepropionic, β-(iso-propylidene)-propionic, n-propylmalonic, p-iso-propyl-phenylacetic, pyridine-3-carboxylic, pyridine-4-carboxylic, pyrotartaric, suberic, succinic, sulfanilic, tartronic, o, m and p-toluic, trimethylacetic, uric, valeric, vinillic and vinylacetic acids.

Although any of the foregoing organic acids may be used to produce the improved films of this invention, some of the acids may have certain objectionable characteristics, such as odor, toxicity or high volatility, which make them undesirable for use in the manufacture of film to be used for food packaging. However, in uses where human consumption is not contemplated, all the acids are satisfactory. Weak organic acids having ionization constants less than $10^{-6}$ are unsuitable, since they are rather ineffective as catalysts for curing anchorage resins, while strong acids, such as the common mineral acids and organic sulfonic acids having ionization constants greater than $10^{-2}$ are undesirable because of the strong degrading effect which they would have on the regenerated cellulose film base. It should also be understood that while it is preferred that the organic acid used have a boiling point above 100° C., the usual drying and curing temperature, this is not absolutely necessary. However, the amount of acid used and its vapor pressure should be such as to make available at least 5%, based on the weight of the resin, during curing of the resin.

The invention will be more clearly understood by referring to the following examples, Example 1 representing the best mode contemplated for practicing the invention.

EXAMPLE 1

Two continuous sheets of gel regenerated cellulose film were passed simultaneously, but separated, through an aqueous bath containing 8% propylene glycol and 0.4% of a melamine-formaldehyde anchorage resin. As the two impregnated gel films emerged from the softener-resin bath, excess bath was removed from each surface of both gel films by means of scrapers pressed lightly against the films. While the two sheets of gel film were passing toward the nip of a pair of press rolls, a 5% solution of citric acid was applied uniformly across the bottom surface of the top film. The gel films were pressed into intimate contact as they passed between the press rolls and were subsequently dried to a moisture content of about 4% over a series of steam-heated drums while being held in intimate contact. The combined effect of the citric acid and high drying temperature cured the resin between the films to such a degree that the films were strongly bonded together and could not be separated even when the laminate was exposed to water for a prolonged period. After being dried, the laminate was wound up in the form of a roll and was analyzed and found to contain 20% propylene glycol, 0.45% anchorage resin and 0.74% citric acid and had a unit weight of 61 gms./square meter.

The roll of laminated regenerated cellulose film was then coated on both sides with an aqueous dispersion of the copolymer of vinylidene chloride, methyl, acrylate and itaconic acid in the ratio of 94/6/1 which had been prepared by the process described in U.S. Patent 2,570,478 and modified to facilitate smoothing by the addition of 18% glycerine as taught by U.S. Patent 2,961,340. During the coating operation, the laminate film remained bonded firmly together and the resulting copolymer coated laminated film was found to have a unit weight of 73 gms./sq. meter, a total softener content of 28%, a heat-seal strength of 228 gms./1.5 inch after being conditioned at 81% relative humidity and a stress-flex value of 104 at 32° F.

After a sample of this coated laminate had been aged for six months, its color, heat-seal strength at 81% relative humidity and stress-flex value at 32° F. were checked and found to be essentially unchanged. Hence, the presence of the rather large amount of citric acid in the coated laminate had no noticeable detrimental effect.

The details of the method of testing the laminated films are as follows:

*Heat-seal strength* is measured by cutting a piece of the coated film 4" x 10" with the grain running in the long or machine direction into two pieces 4" x 5" each. The two pieces are superimposed so that opposite surfaces are in contact. The two pieces of superimposed film are then sealed together at each end at right angles to the grain. A ¾" wide sealing bar heated to a temperature of 140° C. at 20 p.s.i. pressure contacts the ends for 2 seconds. The sealed sheets are then cut in half at right angles to the grain. From the center of the two resulting pieces, 1½" wide strips parallel to the grain are cut. The resulting four sets of strips are tested by opening each set of strips at the free ends, placing them in a Suter testing machine and pulling them apart. The highest force in grams required to pull the strips apart is taken as a measure of the heat-seal bond strength.

*Stress-flex* is a measure of the flexibility and durability of the film. A sample of film 4" x 7" is placed between two rubber-faced clamps 1" apart. One clamp is stationary, the other slides back and forth by gravity on two rods flexing the film as the whole assembly rotates, until the film sample breaks. The stress-flex value indicates the number of strokes of the movable clamp until the film sample breaks. For most applications, a film should have a stress-flex value of at least 20 to be acceptable in the trade.

As a control experiment, another pair of regenerated cellulose gel films were laminated and wound into roll form using the same conditions described above, except that no citric acid was applied to either of the gel films prior to bringing them together into intimate contact at the nip of the press rolls.

After the two films had been dried to about 4% moisture content over a series of steam-heated drums while being held in intimate contact, the resulting laminate, which was wound in roll form, was found to be strongly bonded under ordinary conditions of humidity. However, on exposing a sample of this laminate to water for a few minutes, the films composing the laminate were easily separated.

An attempt was made to coat this roll of laminate with an aqueous vinylidene chloride copolymer dispersion essentially identical to the dispersion described above using a similar coating condition. The coating attempt failed because the cellulose sheets composing the laminate separated in the coating machine dryer after the aqueous copolymer dispersion had been applied to both outer surfaces and the steam that formed between the separated sheets as a result of the intense heat of the dryer caused the two sheets to be forced widely apart and to come into contact with the stationary heater elements which caused the films to break soon after the coating operation had begun.

EXAMPLE 2

Another roll of laminated regenerated cellulose gel film was prepared as in Example 1 with the resin and acid being applied separately except that the resin was guanidine-urea-formaldehyde and the concentrations of the resin and citric acid were reduced to such an extent that the resulting dried laminate contained 0.20% resin and 0.13% citric acid. On exposing a sample of this laminate to water for a prolonged period, the sheets forming the laminate could not be separated.

In a control, two continuous sheets of dried, softened regenerated cellulose film containing 5% moisture and 10% propylene glycol were passed simultaneously at the same speed toward a squeeze roll where they were brought into intimate contact, after having their adjacent inner surfaces sprayed uniformly with a cool aqueous solution containing 10% citric acid and 10% of a guanidine-urea-formaldehyde resin in sufficient quantity to leave 0.30% (dry weight basis) of both the acid and resin in the resulting laminate. The moisture (3%) added to the laminated film by the applied solution was removed by immediately passing the laminate over a series of steam-heated rolls (about 90° C.) arranged to cause the laminate to travel through a sinuous path, thus keeping the two films forming the laminate held firmly together during the drying operation. The resulting dried laminate was of good appearance and had good bond strength at ordinary humidity. However, the films composing the laminate immediately separated on exposing the laminate directly to cold water.

In another control, two continuous sheets of gel regenerated cellulose film were passed simultaneously, but separated through an aqueous bath containing 8% propylene glycol, 0.4% of a guanidine-urea-formaldehyde resin and 0.4% of citric acid which was maintained at 75° C. The excess softener-resin-acid solution was removed from both surfaces of the two gel films as they emerged from the bath by means of scrapers. The two films were immediately brought into intimate contact by passing them through a pair of press rolls, then subsequently dried to a moisture content of 5% while being held tightly together while passing over heated drums. The first bit of laminate produced in this manner had good appearance. However, on continuing the operation, a scum of insoluble resin formed in the softener-resin-acid bath and small particles of the insoluble resin adhered to the two gel films causing the resulting dried laminate to have an unsightly speckled appearance. Insoluble resin also collected on the dryer drum causing scratches on the laminate surface and added to the contamination of the laminate by occasionally flaking from the dryer drum.

The roll of laminated film wherein the resin and acid had been applied separately was then coated directly with an aqueous dispersion of vinylidene chloride copolymer essentially identical to the copolymer dispersion described in Example 1. The resulting copolymer coated film had good appearance and physical properties.

EXAMPLE 3

Another roll of laminated regenerated cellulose film was prepared as in Example 2 except that the concentrations of the guanidine-urea-formaldehyde resin and citric acid were adjusted so that the dried laminate contained 0.45% resin and 2.05% citric acid. This roll of laminate was then coated without difficulty with an aqueous copolymer dispersion similar to the dispersion described in Example 1 to yield a coated laminate having good appearance and physical properties, except for a substandard 81% relative humidity heat-seal strength of 158 grams/1.5 inch.

EXAMPLE 4

A roll of laminate was made essentially as in Example 1 except that a melamine-formaldehyde-polyalkylene-polyamine resin (U.S. Patent 2,796,362) was used and the concentration of citric acid was reduced. The dried laminate was analyzed and found to contain 0.39% resin and 0.51% citric acid. This roll of film was coated without difficulty with an aqueous copolymer dispersion similar to that used in Example 1. The coated laminate had normal appearance and physical properties; the 81% relative humidity heat-seal strength was 318 grams/1.5 inch.

EXAMPLES 5–9

A series of laminated regenerated cellulose film samples were prepared individually using a guanidine-urea-formaldehyde and the general procedure described in Example 1; however, a different organic acid was used to prepare each laminate sample. The acids used were: maleic, itaconic, lactic, gluconic and tartaric. In preparing each laminate sample, the concentration of the resin was adjusted so that after being dried the laminate would contain about 0.4% resin. The amount of organic acid used in preparing each laminate was also adjusted in an effort to insure that each laminate would contain 0.1 to 0.5% of the acid after being dried. In a control, citric acid was used but only enough to provide 0.05% of the acid, based on the weight of the dried laminate.

The bond strength of each of these laminate samples was tested by soaking them in water for a few minutes, then rubbing each sample between the thumb and forefinger with considerable pressure applied in an effort to separate the two sheets composing the laminate by sheer force. The sample made with the low amount of citric acid was the only sample in the series that could be delaminated in this manner. Past experience has shown that laminated films which are resistant to delamination after being exposed to water can also be coated without difficulty with an aqueous vinylidene chloride copolymer dispersion.

EXAMPLES 10–27

In each of the following examples, the general procedure described in Example 1 is used, except that the acids: benzoic, o-chlorobenzoic, o-phthalic, picric, salicylic, fumaric, cyanuric and sulfanilic are applied from hot aqueous solutions due to their limited solubilities in cold water. The results are summarized in Table I and indicate the importance of using acids having an ionization constant in the range of $10^{-2}$–$10^{-6}$.

Table I

| Example No. | Acid Used | Ionization Constant of Acid | Percent Acid in Dry Laminate | Type Resin Used [1] | Percent Resin in Dry Laminate | Bond Strength Tested Under Wet-Out Conditions [2] |
|---|---|---|---|---|---|---|
| 10 | Acetic | $1.8 \times 10^{-5}$ | 0.57 | G-U-F | 0.35 | Yes. |
| 11 | Benzoic | $6.3 \times 10^{-5}$ | 0.24 | U-F | 0.91 | Yes. |
| 12 | o-Chlorobenzoic | $1.4 \times 10^{-3}$ | 0.45 | M-F | 0.43 | Yes. |
| 13 | Alpha-Chloropropionic | $1.6 \times 10^{-3}$ | 0.29 | M-F | 1.25 | Yes. |
| 14 | Citraconic | $3.3 \times 10^{-3}$ | 0.43 | U-F | 0.51 | Yes. |
| 15 | Formic | $1.8 \times 10^{-4}$ | .21 | U-F | 1.62 | Yes. |
| 16 | Fumaric | $9.3 \times 10^{-4}$ | 0.90 | G-U-F | 0.48 | Yes. |
| 17 | Glycolic | $1.5 \times 10^{-5}$ | 0.25 | U-F | 0.26 | Yes. |
| 18 | Glutaric | $4.5 \times 10^{-5}$ | 0.62 | M-U-F | .75 | Yes. |
| 19 | Lactic | $1.4 \times 10^{-4}$ | 0.38 | M-F | 0.82 | Yes. |
| 20 | Malic | $4 \times 10^{-4}$ | 0.41 | U-F | 0.54 | Yes. |
| 21 | o-Phthalic | $1.3 \times 10^{-3}$ | 0.13 | M-F-P-P | 1.91 | Yes. |
| 22 | Pyridine-2-Carboxylic | $5 \times 10^{-6}$ | 1.11 | M-F-P-P | 1.76 | Yes. |
| 23 | Salicylic | $1.1 \times 10^{-3}$ | 0.15 | M-F-P-P | 0.81 | Yes. |
| 24 | Succinic | $6.4 \times 10^{-5}$ | 0.88 | U-F | 1.23 | Yes. |
| 25 | Sulfanilic | $6.5 \times 10^{-4}$ | 0.20 | G-U-F | 0.66 | Yes. |
| 26 | Tartaric | $9.6 \times 10^{-4}$ | 0.36 | U-F | 0.94 | Yes. |
| 27 | Trimethylacetic | $8.9 \times 10^{-6}$ | 1.27 | M-F-P-P | 1.37 | Yes. |
| Control A | Picric | $4.2 \times 10^{-1}$ | 0.27 | M-F | 1.46 | Yes, but laminate unsatisfactory (yellowish and brittle). |
| Control B | Cyanuric | $1.8 \times 10^{-7}$ | 0.45 | M-F | 0.67 | No. |
| Control C | Glycine | $1.7 \times 10^{-10}$ | 1.64 | M-F | 1.47 | No. |

[1] U-F = Urea-Formaldehyde Resin; M-F = Melamine-Formaldehyde Resin; M-U-F = Melamine-Urea-Formaldehyde Resin; G-U-F = Guanidine-Urea-Formaldehyde Resin; M-F-P-P = Melamine-Formaldehyde-Polyethylene-Polamine Resin.
[2] Yes = Resisted delamination after 5 minutes exposure. No = Laminate easily delaminated after 5 minutes exposure.

Having fully disclosed the invention, what is claimed is:

1. A process for laminating regenerated cellulose film which comprises impregnating at least two separated sheets of regenerated cellulose film, in the wet gel state, with an acid-free aqueous solution of an acid-catalyzable thermosetting resin that is partially polymerized, water soluble and can be further polymerized to a water insoluble form, of sufficient concentration to leave 0.15–2%, based on the dry weight of said sheets, on the sheets; thereafter, applying to one of the impregnated surfaces of at least one of said sheets of regenerated cellulose film an aqueous solution consisting essentially of a water soluble organic acid having an ionization constant of $1.0 \times 10^{-6}$ to $1.0 \times 10^{-2}$, the aqueous solution being applied in an amount to leave 0.1–1% of said organic acid on the sheets, based on the dry weight of said sheets; pressing the acid containing surface against a surface of another sheet of impregnated regenerated cellulose film; and heating said sheets for a time and at a temperature sufficient to further polymerize said acid-catalyzable thermosetting resin, to dry the sheets, and to form a laminate.

2. A process for laminating regenerated cellulose film which comprises impregnating at least two separated sheets of regenerated cellulose film, in the wet gel state, with an acid-free aqueous solution of an acid-catalyzable, partially polymerized, thermosetting resin selected from the group consisting of guanidine-carbamide-aldehyde, urea-aldehyde, melamine-aldehyde, melamine-urea-aldehyde, and melamine-aldehyde-polyalkylene-polyamine, of sufficient concentration to leave 0.15–2%, based on the dry weight of said sheets, on the sheets; thereafter, applying to one of the impregnated surfaces of at least one of said sheets of regenerated cellulose film an aqueous solution consisting essentially of a water soluble organic acid having an ionization constant of $1.0 \times 10^{-6}$ to $1.0 \times 10^{-2}$, the aqueous solution being applied in an amount to leave 0.1–1% of said organic acid on the sheets, based on the dry weight of said sheets; pressing the acid containing surface against a surface of another sheet of impregnated regenerated cellulose film; and heating said sheets for a time and at a temperature sufficient to further polymerize said acid catalyzable thermosetting resin, to dry the sheets, and to form a laminate.

3. A process for laminating regenerated cellulose film which comprises impregnating two separated sheets of regenerated cellulose film, in the wet gel state, with an acid-free aqueous solution of an acid-catalyzable thermosetting resin that is partially polymerized, water soluble and can be further polymerized to a water insoluble form, of sufficient concentration to leave 0.15–2%, based on the dry weight of said sheets, on the sheets; thereafter, applying to only one of the impregnated surfaces of each of said sheets of regenerated cellulose film an aqueous solution consisting essentially of a water soluble organic acid having an ionization constant of $1.0 \times 10^{-6}$ to $1.0 \times 10^{-2}$, the aqueous solution being applied in an amount to leave 0.1–1% of said organic acid on the sheets, based on the dry weight of said sheets; pressing the acid containing surface of one sheet against the acid containing surface of the other sheet; and heating said sheets for a time and at a temperature sufficient to further polymerize said acid-catalyzable thermosetting resin, to dry the sheets, and to form a laminate.

4. A process as in claim 1, wherein said organic acid is citric acid.

5. A process as in claim 1, wherein said organic acid is maleic acid.

6. A process as in claim 1, wherein said organic acid is itaconic acid.

7. A process as in claim 1, wherein said organic acid is lactic acid.

8. A process as in claim 1, wherein said organic acid is gluconic acid.

9. A process as in claim 1, wherein said acid-catalyzable thermosetting resin is a melamine-formaldehyde resin.

10. A process as in claim 1, wherein said acid-catalyzable thermosetting resin is a guanidine-urea-formaldehyde resin.

11. A process as in claim 1, wherein said acid-catalyzable thermosetting resin is a urea-formaldehyde resin.

References Cited by the Examiner

UNITED STATES PATENTS

| | | | |
|---|---|---|---|
| 2,301,959 | 11/1942 | Lanning | 117—145 |
| 2,376,200 | 5/1945 | Smidth | 260—29 |
| 2,471,497 | 5/1949 | Roberts et al. | 156—331 |
| 2,686,744 | 8/1954 | Cornwell | 154—50 |
| 2,697,090 | 12/1954 | Farber | 260—71 |
| 3,006,784 | 10/1961 | Ryan et al. | 117—161 |
| 3,131,116 | 4/1964 | Pounds | 156—331 X |

FOREIGN PATENTS

| | | |
|---|---|---|
| 544,595 | 4/1942 | Great Britain. |
| 558,356 | 1/1944 | Great Britain. |

EARL M. BERGERT, *Primary Examiner.*

ALEXANDER WYMAN, *Examiner.*